(12) United States Patent
Shibano

(10) Patent No.: US 8,111,475 B2
(45) Date of Patent: Feb. 7, 2012

(54) MAGNETIC RECORDING MEDIUM AND MAGNETIC RECORDING APPARATUS

(75) Inventor: Motomichi Shibano, Oume (JP)

(73) Assignee: Toshiba Storage Device Corporation, Tokyo (JP)

( * ) Notice: Subject to any disclaimer, the term of this patent is extended or adjusted under 35 U.S.C. 154(b) by 79 days.

(21) Appl. No.: 12/694,770

(22) Filed: Jan. 27, 2010

(65) Prior Publication Data
US 2010/0128384 A1    May 27, 2010

Related U.S. Application Data

(63) Continuation of application No. PCT/JP2007/000805, filed on Jul. 27, 2007.

(51) Int. Cl.
*G11B 5/09* (2006.01)
*G11B 5/596* (2006.01)
(52) U.S. Cl. ....................... 360/48; 360/77.08
(58) Field of Classification Search .............. None
See application file for complete search history.

(56) References Cited

U.S. PATENT DOCUMENTS

| | | | |
|---|---|---|---|
| 2003/0156347 A1 | 8/2003 | Ishii | |
| 2006/0012913 A1* | 1/2006 | Nakamura et al. | 360/77.02 |
| 2006/0250718 A1* | 11/2006 | Nakamura et al. | 360/1 |
| 2007/0139804 A1* | 6/2007 | Ito et al. | 360/48 |

FOREIGN PATENT DOCUMENTS

| | | |
|---|---|---|
| JP | 03-187072 | 8/1991 |
| JP | 2000-123506 | 4/2000 |
| JP | 2000-163893 | 6/2000 |
| JP | 2003-249044 | 9/2003 |
| JP | 2004-199806 | 7/2004 |
| JP | 2004199806 | * 7/2004 |
| JP | 2005-050482 | 2/2005 |
| JP | 2006-164349 | 6/2006 |

OTHER PUBLICATIONS

International Search Report mailed by Japanese Patent Office on Nov. 13, 2007.

* cited by examiner

*Primary Examiner* — Daniell L Negron
*Assistant Examiner* — Regina N Holder
(74) *Attorney, Agent, or Firm* — Knobbe Martens Olson & Bear, LLP

(57) ABSTRACT

According to one embodiment, a magnetic recording medium to which a signal is recorded by reversing magnetization of a magnetic body, includes: a servo region to which a servo signal is written; a data region configured to include a magnetic region of a track to which data is written, the magnetic region being separated from other magnetic region of other track; and a periodic magnetic pattern region configured to be provided at a head portion of the data region following the servo region, and is inclined at a predetermined angle with respect to a circumferential direction of the magnetic recording medium, over a predetermined length in a radius direction of the magnetic recording medium.

20 Claims, 14 Drawing Sheets

MAGNETIC RECORDING MEDIUM AND MAGNETIC RECORDING APPARATUS

CROSS-REFERENCE TO RELATED APPLICATIONS

This application is a continuation of PCT international application Ser. No. PCT/JP2007/000805 filed on Jul. 27, 2007 which designates the United States, incorporated herein by reference.

BACKGROUND

1. Field

One embodiment of the invention relates to a magnetic recording medium including magnetic regions that are separated between tracks, and to a magnetic recording apparatus recording information to and reproducing information from the magnetic recording medium.

2. Description of the Related Art

In recent years, there has been a demand for magnetic recording apparatuses, and particularly for magnetic disk apparatuses, to have a high transmission rate and large capacity. With an improvement in the performance of calculators, required performances tend to be improved.

In magnetic recording, in order to improve recording density, it is necessary to form a row of fine magnetic domains in a magnetic recording layer using the magnetic field generated by a recording head. Accordingly, magnetic recording media using an in-plane recording method and a vertical recording method have been researched and developed.

A structure for physically narrowing down a track pitch in a radius direction has been proposed to increase recording density per unit area. In the vertical recording method, it has been checked that a recording density of 100 Gbit/inch^2 or more is obtained.

FIG. 22 is a cross-sectional view of a conventional magnetic disk apparatus. A magnetic recording medium 10 is attached to a spindle motor 14 through a hub 15, and is rotated at a predetermined angular velocity. The spindle motor 14 is rotated while maintaining a predetermined number of revolutions under the control of a control mechanism 18. A driving mechanism 17 is composed of a voice coil motor (VCM), and rotates a slider having a recording and reproducing head 16 mounted thereon such that the recording and reproducing head 16 is loaded to or unloaded from the magnetic recording medium 10 and seek an inner circumference or an outer circumference. The control mechanism 18 performs servo control on the driving mechanism 17 to control the rotation of the slider having the recording and reproducing head 16 mounted thereon.

In the magnetic recording medium 10, when the track pitch is narrowed, adjacent tracks are written due to a leakage magnetic field generated from a side surface of the magnetic head 16. Accordingly, crosstalk occurs when recorded data is reproduced. In addition, since a bit length is small, the resolution of a recording mark is lowered, which results in the deterioration of signal quality.

In order to prevent the deterioration of signal quality due to an increase in recording density, a discrete track recording method has been proposed. As illustrated in FIG. 23, in the discrete track recording method, in a data region 12 of the magnetic disk 10, a non-magnetic region 13a is formed between adjacent tracks 13b. The data regions 12 are separated from each other with a servo region 11 interposed therebetween in the circumferential direction of the magnetic disk 10, and data can be recorded only on the track 13b made of a magnetic body (for example, see Japanese Patent Application Publication (KOKAI) No. 2005-50482).

On the other hand, a patterned media recording method that isolates magnetic domain particles has been proposed. Instead of forming the track 13b in the data region 12 as a continuous magnetic region, the patterned media recording method forms a single bit pattern, thereby improving recording resolution.

In the magnetic disk apparatus, in order to stably perform recording and reproducing, it is necessary to position the recording and reproducing head 16 over a predetermined track or bit pattern. Therefore, a sector servo method is used. The sector servo method controls the recording and reproducing head 16 to be disposed at an optimal position on the basis of a servo signal written to a servo region 11 that is arranged at a head portion of the data region 12. Since the servo control is intermittently performed on each sector, it is called a sample servo method.

In the conventional continuous recording medium, even when there is a little positional fluctuation in the recording and reproducing head 16 between the sectors or there is a deviation in track servo, it is possible to reduce influence of the fluctuation or the deviation on recording and reproducing characteristics by setting a track pitch with a margin.

However, in the discrete track method or the patterned media method, when the data region is patterned and the gap between adjacent tracks is reduced, the position accuracy of the pattern during the manufacture of a medium, the positional fluctuation of the recording and reproducing head 16, and the track servo deviation exceed their permissible limits.

Therefore, even when appropriate track servo is performed on the servo frame arranged at the head of each sector, it is difficult to perform recording and reproducing at the exact position of the data region.

In the conventional continuous recording medium, a writing is performed at the rising edge of a write gate signal using a servo gate signal indicating the end of the servo region 11 as a base point. In a general format of the data region, a preamble and a sync mark are written at a predetermined time interval by the write gate signal, and a data signal is written. During reading, a reproduction signal is synchronized with the preamble module at the head and the gain of an amplifier is adjusted to recognize a sync mark. Then, signals are read from the data region.

In performing the aforementioned operation by the patterned media recording method, during writing, the bit pattern of the medium needs to be disposed at a write position. As a signal such as the write gate signal, a write clock signal and the bit pattern position are required to be synchronized in time.

A method has been proposed which synchronizes write clock timing with the bit pattern position (for example, see Japanese Patent Application Publication (KOKAI) No. 2006-164349). In the method, recording is performed at certain timing and the error rate of a reproduced signal is examined to determine whether there is an error in the recording. A recording clock is generated on the basis of the determination result, and the phase of a recording is adjusted to the conditions where an optimal error rate is obtained, in order to perform optimal recording.

In a magnetic disk apparatus having a magnetic recording and reproducing head mounted on a swing arm, when recording and reproducing are performed, the positional deviation between a write head and a read head occurs. When the read head is disposed at a specific track, the write head is displaced in the radius direction of the medium, according to the yaw angle of the head. Therefore, it is necessary to perform recording by acquiring positional information (servo information) using the read head and accurately moving the write head by a distance corresponding to the relative position between the write head and the read head to position the write head.

Similarly, the positional deviation between the write head and the read head in the circumferential direction and the radius direction of the medium varies depending on the yaw angle. The positional deviation appears as the deviation between recording timings. Therefore, it is possible to correct the recording timing at each position of the medium in the radius direction.

As such, when the relative positional relationship between the write head and the read head is not accurately checked according to the position of the medium with the yaw angle, it takes long time to examine the recording timing, and the operation time of the apparatus is increased, which results in performance deterioration. The aforementioned conventional technology does not disclose a method of detecting the positional relationship between the write head and the read head.

According to conventional technology, the servo region is patterned to increase recording density. In the patterned media recording method and the discrete track recording method, a servo pattern is formed in the servo region by patterning a magnetic film.

In this case, according to the conventional continuous medium recording method, recording is to be performed by a bipolar magnetic pattern. However, a patterned magnetic film comprises a unipolar magnetization pattern. Therefore, the amplitude of a reproduction signal is reduced by a bipolar magnetization pattern signal, and the transient response (Sag) of the signal occurs due to transition from a bipolar signal of the data region to a unipolar signal of the servo region. Therefore, when the signal is synchronized, the stability of the signal is reduced.

In the patterned medium, the position accuracy of the bit pattern on the medium is likely to be reduced due to manufacturing. In addition, when a circular track having the bit pattern formed therein is eccentrically arranged with respect to the rotation center of a spindle motor (SPM), the radius of rotation varies depending on the amount of eccentricity and a circumferential velocity is changed. As a result, the deviation between the recording and reproducing timings occurs, and a phase difference between the position of the bit pattern on the medium and a recording and reproduction signal clock occurs.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings, in the order of a magnetic recording medium, a magnetic recording apparatus, write synchronization signal generating process, process of measuring an offset between heads, a write/read operation, a magnetic recording medium according to another embodiment, and other embodiments. In general, according to one embodiment of the invention, a magnetic recording medium to which a signal is recorded by reversing magnetization of a magnetic body, comprises: a servo region to which a servo signal is written; a data region configured to include a magnetic region of a track to which data is written, the magnetic region being separated from other magnetic region of other track; and a periodic magnetic pattern region configured to be provided at a head portion of the data region following the servo region, and is inclined at a predetermined angle with respect to a circumferential direction of the magnetic recording medium, over a predetermined length in a radius direction of the magnetic recording medium.

According to another embodiment of the invention, a magnetic recording apparatus comprises: a magnetic recording medium, a head, and a control unit. The magnetic recording medium comprises: a servo region to which a servo signal is written; a data region configured to include a magnetic region of a track to which data is written, the magnetic region being separated from other magnetic region of other track; and a periodic magnetic pattern region configured to be provided at a head portion of the data region following the servo region, and is inclined at a predetermined angle with respect to a circumferential direction of the magnetic recording medium, over a predetermined length in a radius direction of the magnetic recording medium. The head is configured to include a read element and a write element, and perform reading and writing with respect to the magnetic recording medium. The control circuit is configured to control the read element and the write element, and generate a signal synchronized with a write clock signal from a reproduction signal read from the periodic magnetic pattern region by the read element.

Figure 1:
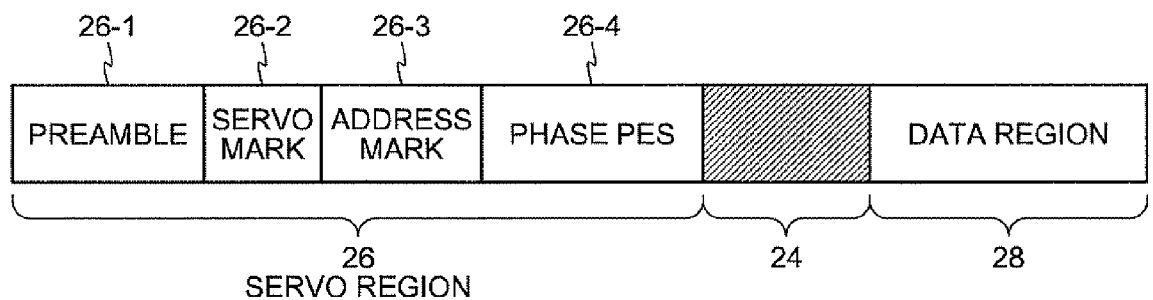
FIG. 1 is an exemplary diagram of a format of a magnetic recording medium according to one embodiment of the invention.
Figure 2:
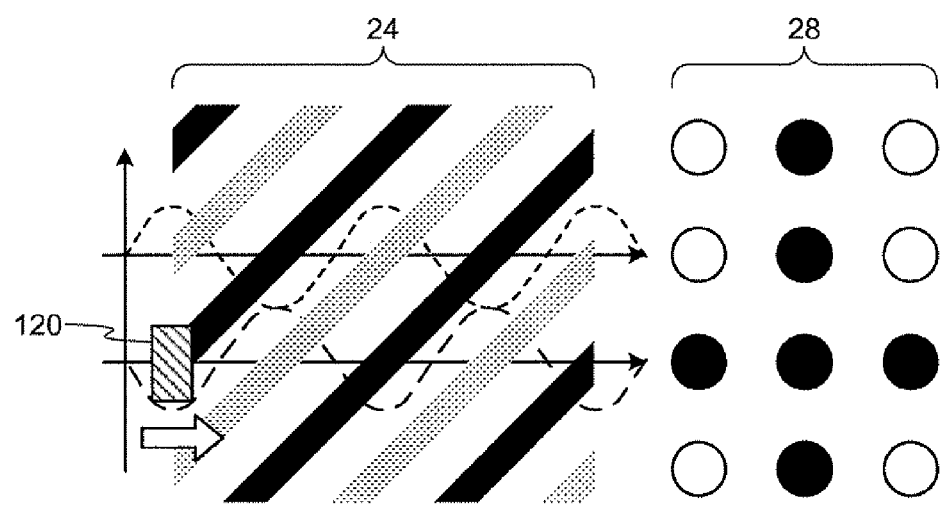
FIG. 2 is an exemplary diagram of a structure of a magnetic pattern region of FIG. 1 in the one embodiment.
Figure 3:
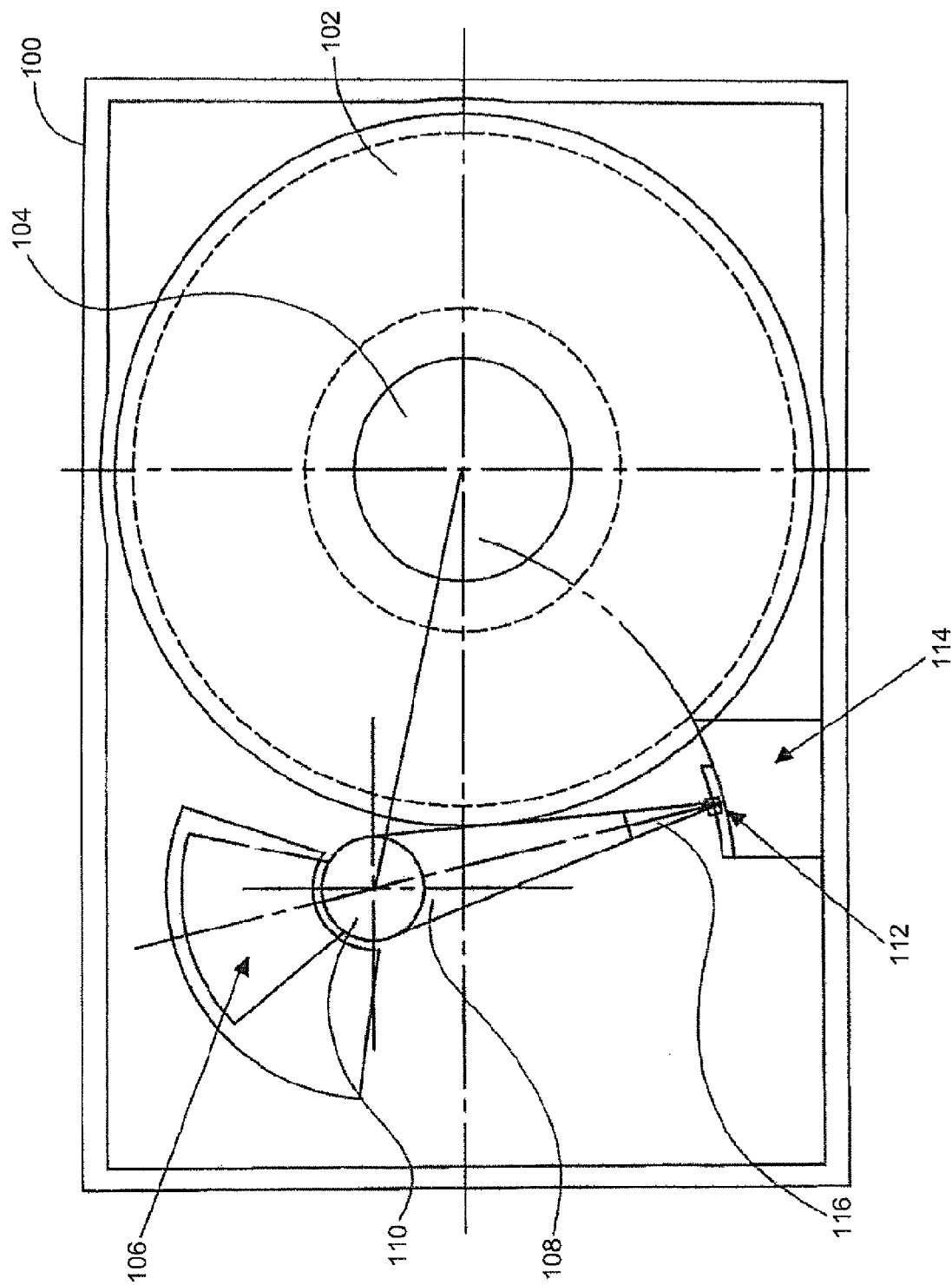
FIG. 3 is an exemplary diagram of a structure of a magnetic recording apparatus comprising the magnetic recording medium of FIG. 1 in the one embodiment.
Figure 4:
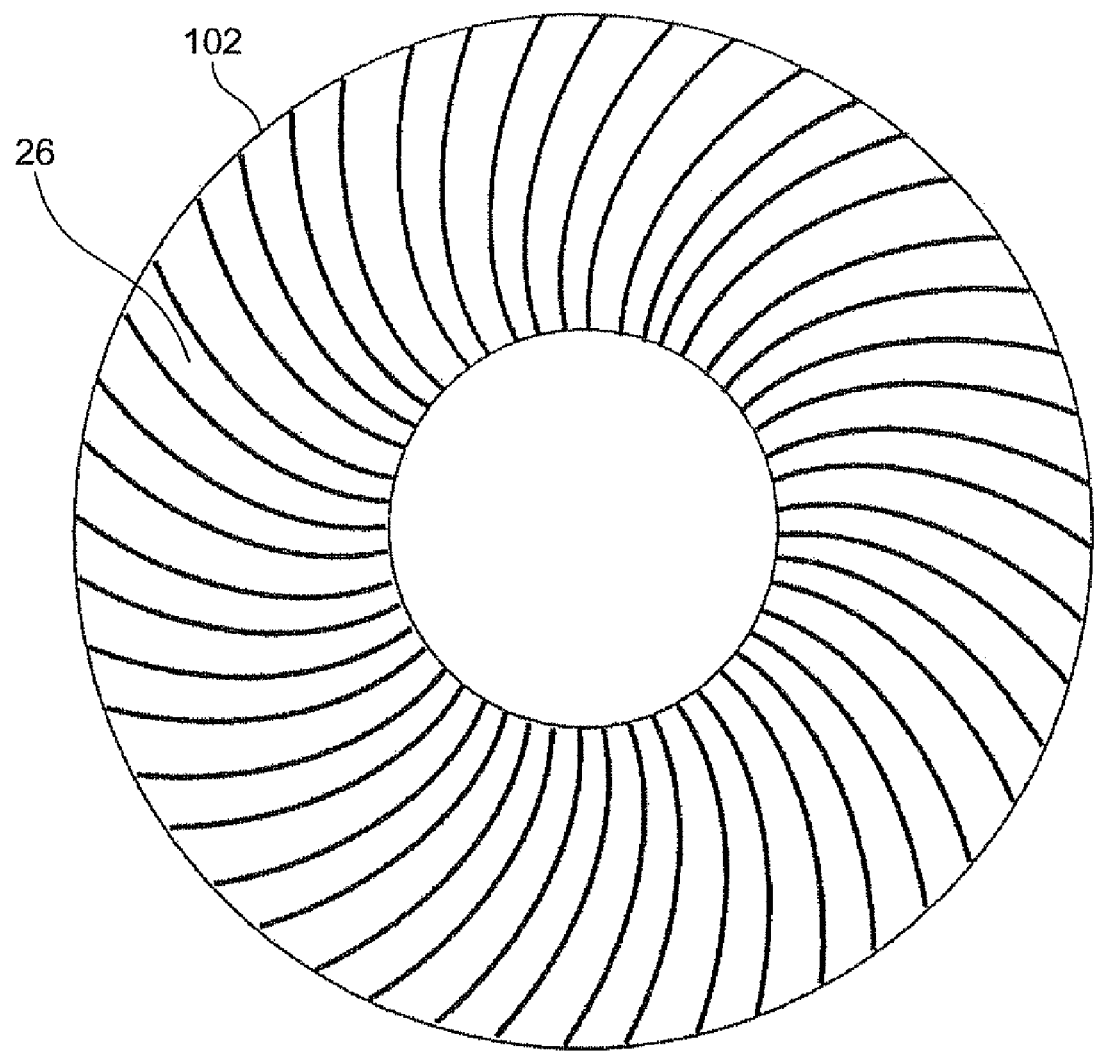
FIG. 4 is an exemplary diagram of the magnetic recording medium of FIG. 3 in the one embodiment.

FIG. 1 is a diagram illustrating a format of a magnetic recording medium according to one embodiment of the invention, FIG. 2 is a partial enlarged view of FIG. 1, FIG. 3 is a diagram illustrating a structure of a magnetic disk apparatus comprising the magnetic recording medium illustrated in FIG. 1, and FIG. 4 is a diagram illustrating the magnetic disk illustrated in FIG. 3.

First, the magnetic disk apparatus will be described in detail with reference to FIGS. 3 and 4. As illustrated in FIG. 3, a magnetic disk 102, which is a magnetic recording medium, is attached to a rotating shaft (hub) 104 of a spindle motor. The spindle motor rotates the rotating shaft 104 to rotate the magnetic disk 102. An arm 108 is rotated about a rotating shaft 110 by a voice coil motor (VCM) 106. A suspension 116 is provided at the leading end of the arm 108.

Ahead slider 112 having a recording head (a read element and a write element) mounted thereon is provided at the leading end of the suspension 116. A ramp loading mechanism 114 is provided which withdraws the recording head from the magnetic disk 102 and packs it. These mechanisms are provided in a device case 100.

As illustrated in FIGS. 1 and 2, the magnetic disk 102 is a patterned medium. In the magnetic disk apparatus, the VCM 106 rotates the arm 108 in the radius direction of the magnetic disk 102 to position the head slider 112 comprising the recording head at a desired track of the magnetic disk 102.

As illustrated in FIG. 4, in the magnetic disk 102, concentric tracks are composed of sectors having servo zones 26 and data zones formed of isolated magnetic domain particles. The servo zone 26 is continuously formed in the radius direction of the magnetic disk 102. The recording head reads and writes data of an arbitrary sector in one track when the magnetic disk 102 is rotated.

The recording head comprises a read element and a write (vertical recording) element, and is formed by sequentially laminating a read element comprising a magneto-resistive (MR) element and a write element comprising a write coil on the head slider 112. Therefore, the read element and the write element are disposed at different positions, and the positional deviation (offset) between the read element and the write element in the radius direction and in the circumferential direction occurs due to the rotation position of the arm (swing arm) 108 (yaw angle).

As illustrated in FIG. 1, the sector format of the magnetic disk 102 comprises the servo region 26, a data region 28, and a magnetic pattern region 24 provided between the servo region 26 and the data region 28.

The servo region 26 comprises a preamble 26-1, a servo mark 26-2, an address mark 26-3, and a position signal (PES) 26-4. A post code for recording changed information of a medium may be provided after the position signal (PES) 26-4.

In the embodiment, a magnetic pattern 24 is formed at a head portion of the data region 28 following the servo region 26. The data region 28 has a patterned media structure in which a plurality of isolated magnetic domain particles (bit pattern) represented by circles in FIG. 2 is arranged in the track direction. However, the data region 28 is not limited thereto, and a discrete track structure in which tracks are divided in a concentric circle shape or a spiral shape in the radius direction of the medium may be used.

As illustrated in detail in FIG. 2, the magnetic pattern 24 is inclined at a predetermined angle with respect to the radius direction and the circumferential direction of the medium. In FIG. 2, a hatched portion is the magnetic region. In FIG. 2, the density of the hatched portion is changed according to the magnetization direction.

A method of forming the magnetic pattern is the same as a method of forming a bit pattern (magnetic domain particles). For example, in the embodiment, the method of forming the magnetic pattern comprises forming a magnetic layer on a magnetic recording medium substrate, etching a magnetic body to pattern it, and forming a protective film and a lubrication film.

Specifically, the magnetic body of the magnetic pattern 24 and the magnetic body of the data region 28 are made of materials having the same magnetic characteristics. However, when a characteristic of a magnetic body is to be changed by implanting ions for a method of manufacturing a medium, a magnetic characteristic of the magnetic body of the magnetic pattern 24 and the magnetic body of the data region 28 may be changed. In the embodiment, both of the magnetic bodies have the same magnetic characteristic, and the pattern is formed by etching.

As illustrated in FIG. 2, a read output of the head (read element) 120 of when a head 120 is moved (scanned) over the magnetic pattern 24 in the circumferential direction of the medium is a signal having a sinusoidal waveform, and the phase of the sinusoidal wave varies depending on the position of the head 120 in the radius direction. Therefore, it is possible to generate a write clock or a read clock from the sinusoidal wave immediately before the data region, and measure the positional deviation (offset) between the read element and the write element in the radius direction and the circumferential direction.

That is, a write synchronization region is provided in the magnetic pattern at the head of the data region 28. In this way, when the read element performs reading, a write synchronization signal is obtained. This corresponds to the preamble of write data.

Figure 5:
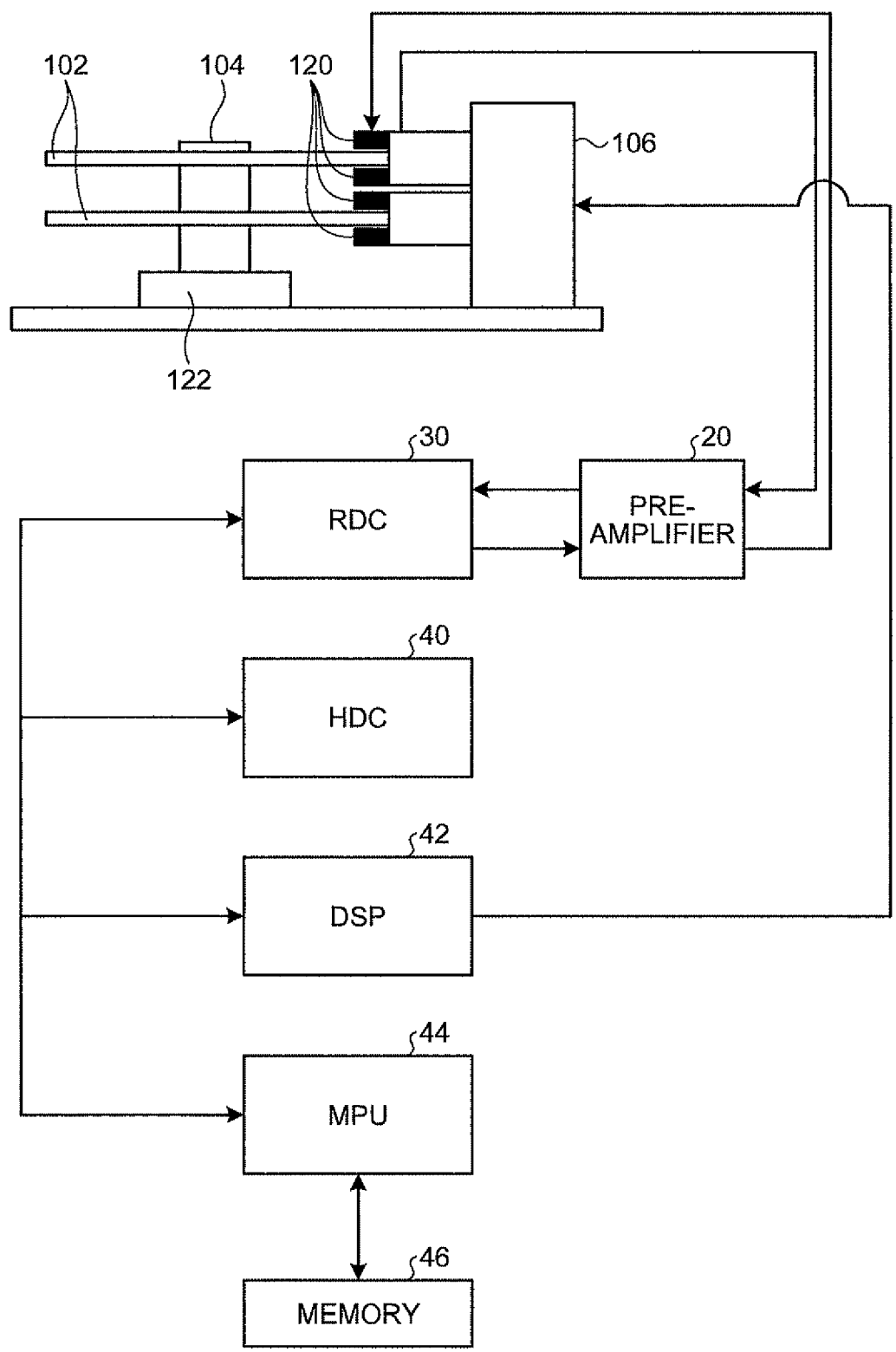
FIG. 5 is an exemplary block diagram of the magnetic recording apparatus of FIG. 1 in the one embodiment.
Figure 6:
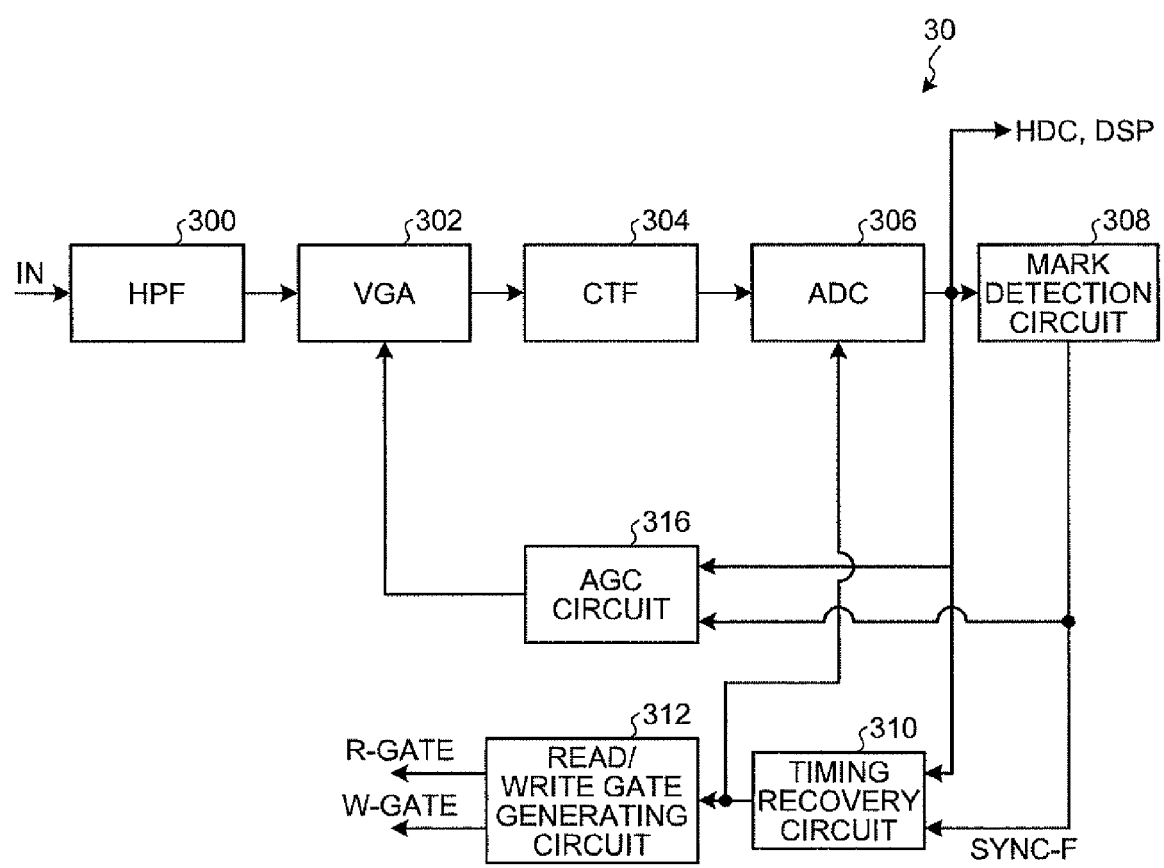
FIG. 6 is an exemplary block diagram of a read channel circuit of FIG. 5 in the one embodiment.

FIG. 5 is a diagram illustrating the circuit structure of the magnetic disk apparatus illustrated in FIG. 3, and FIG. 6 is a block diagram illustrating a read channel circuit illustrated in FIG. 5.

In FIG. 5, the same components as those illustrated in FIGS. 1 to 4 are denoted by the same reference numerals. As illustrated in FIG. 5, a pre-amplifier 20 transmits a write signal to the magnetic head 120 (write element) and amplifies a read signal from the recording head 120 (read element).

As illustrated in FIG. 6, a read channel circuit (RDC) 30 shapes the read signal from the pre-amplifier 20, creates a synchronization block, generates a gate signal, and outputs the read signal.

A digital signal processor (DSP) 42 demodulates positional information obtained from the read signal from the read channel circuit 20, detects the current position, and calculates a VCM driving instruction value on the basis of the difference between the detected current position and a target position. That is, the DSP 42 performs servo control comprising seeking and following.

A micro processing unit (MPU) 44 analyzes a command, monitors the state of the apparatus, and controls each module of the apparatus. A memory (MEM) 46 stores data (for example, offset) used for the process of the MPU. A hard disk controller (HDC) 40 communicates with a host, receives read data from the read channel circuit 30 according to a gate signal and a clock from the read channel circuit 30, stores the received data in a buffer, and transmits the data to the host. In addition, the HDC 40 outputs write data received from the host to the read channel circuit 30 according to the gate signal and the clock from the read channel circuit 30.

The HDC 40 communicates with the host through an interface I/F, such as a universal serial bus (USB: Registered Trademark), an advanced technology attachment (ATA), or a small computer system interface (SCSI).

In the structure illustrated in FIG. 5, the HDC 40 performs data communication with the host or a drive, the DSP 42 performs seeking and following control on the magnetic head 120, and the MPU 44 controls each module according to the command received by the HDC 36.

The read channel circuit 30 will be described with reference to FIG. 6. As illustrated in FIG. 6, the read signal from the pre-amplifier 20 is input to a high pass filter (HPF) 300. The high pass filter 300 cuts a low frequency component (mainly, a DC component) of the read signal, and outputs the read signal to a variable gain amplifier (VGA) 302. The VGA 302 amplifies the output of the high pass filter 300 at a gain from an auto gain control (AGC) circuit 316, which will be described below.

The output of the variable gain amplifier 302 is input to a control filter (CTF) 304. The control filter 304 forms a preliminary filter, and shapes the waveform of a signal. The output of the control filter 304 is input to an analog/digital converter (ADC) 306, and the ADC 306 converts an analog signal into a digital value in synchronization with a sample clock. The output of the ADC 306 is input to a mark detection circuit 308, the AGC circuit 316, and a timing recovery circuit 310.

The mark detection circuit 308 detects, for example, a servo mark (see FIG. 1) or a sync mark from the output of the ADC 306. The AGC circuit 316 performs lock control on the control gain of the variable gain amplifier 302 on the basis of the output of the ADC 306 and the mark detected by the mark detection circuit 308.

The timing recovery circuit 310 performs phase locked loop (PLL) control on a reference clock on the basis of the output of the ADC 306 and the mark detected by the mark detection circuit 308, and outputs the clock (synchronization clock) to the ADC 306.

A read/write gate generating circuit 312 generates a read gate signal and a write gate signal according to the synchronization clock of the timing recovery circuit 310.

The signals are transmitted to the HDC 40, the DSP 42, and the MPU 44, and are used for various read/write control operations.

Figure 7:
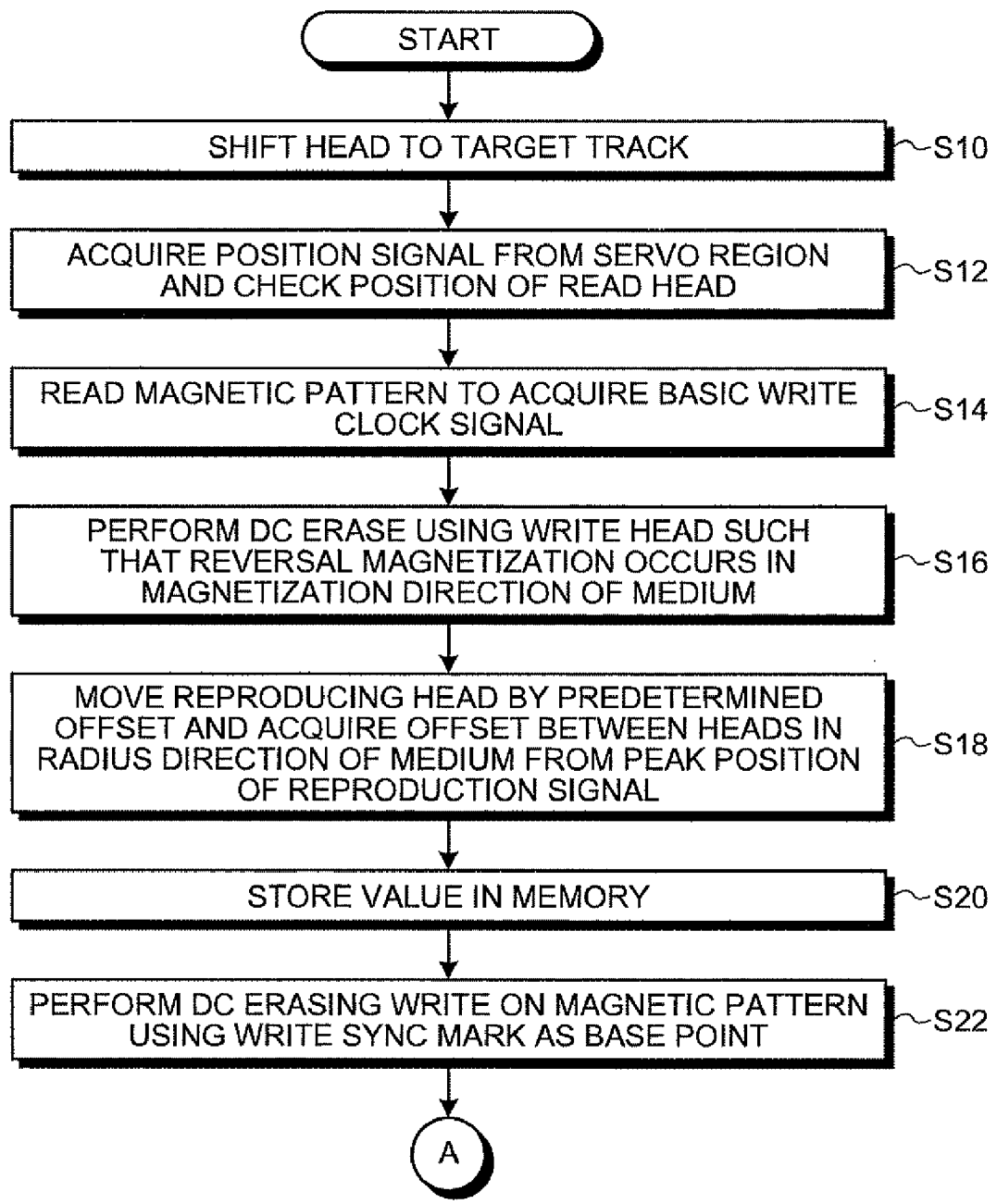
FIG. 7 is an exemplary flowchart of measuring offset between heads using the magnetic pattern of FIG. 1 in the one embodiment.
Figure 8:
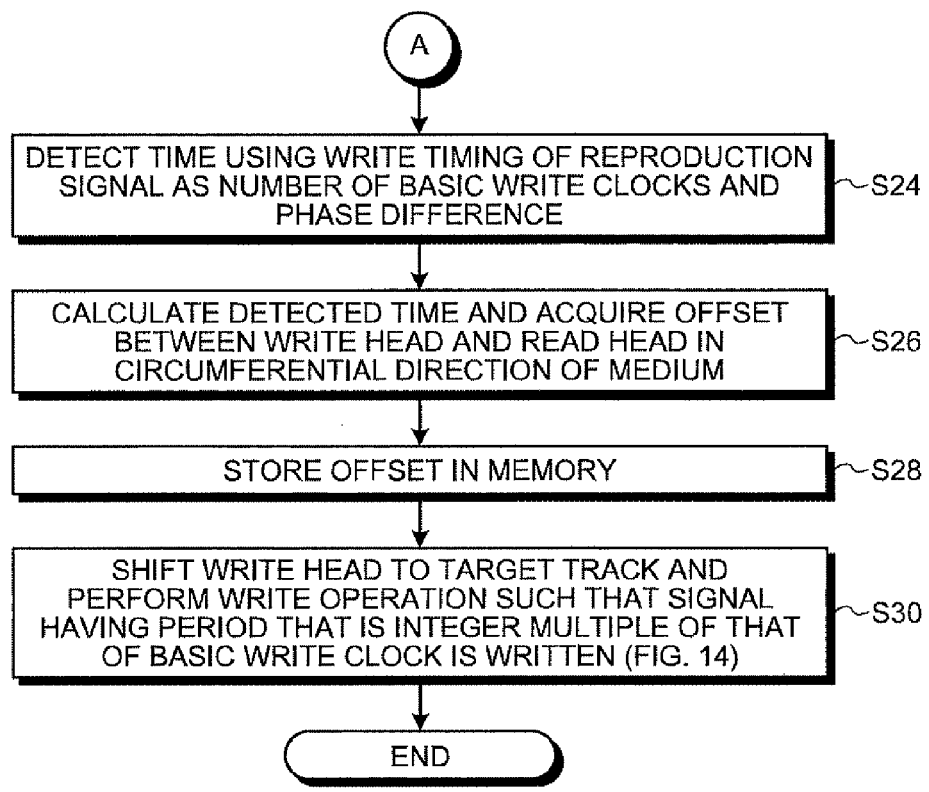
FIG. 8 is an exemplary flowchart of the measuring in the one embodiment.

Next, generating a write synchronization signal using the magnetic pattern and measuring an offset between the write element and the read element in the radius direction and the circumferential direction will be described. FIGS. 7 and 8 are flowcharts illustrating the process performed by the MPU 44 illustrated in FIG. 5, and FIGS. 9 to 14 are diagrams illustrating the process illustrated in FIGS. 7 and 8.

Figure 9:
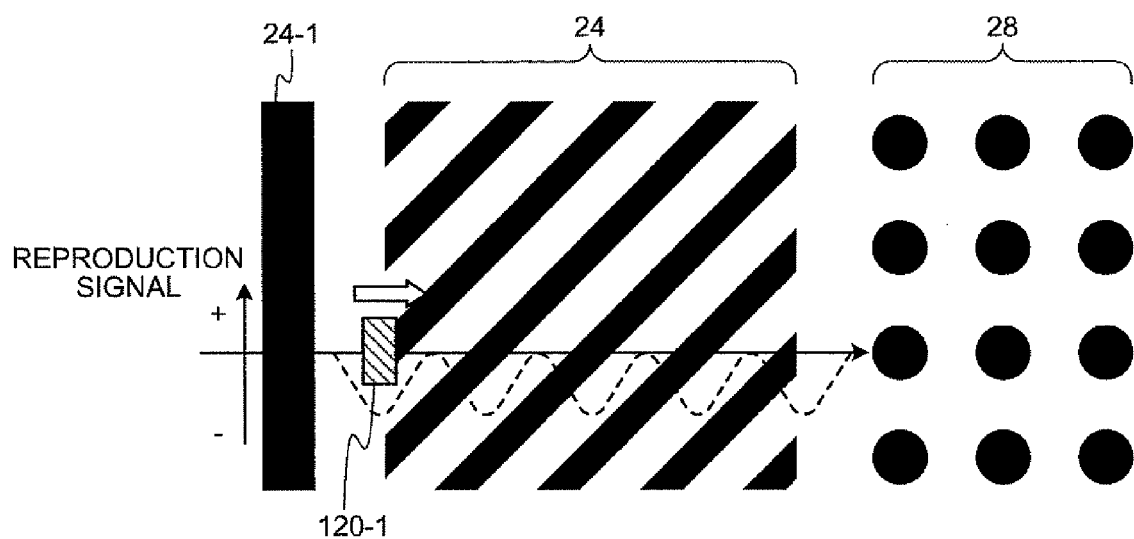
FIG. 9 is an exemplary diagram of write synchronization signal acquiring process of FIG. 7 in the one embodiment.

In FIG. 9, a sync mark 24-1, which is a start point of recording, is provided at the head of the magnetic pattern 24 in the radius direction of the magnetic disk 102. The entire magnetic pattern 24 is erased at the beginning, or it is initialized in the same magnetization direction as that of the servo region 26. Vertical magnetic recording will be described below as an example.

The MPU 44 controls a read element 120-1 of the head 120 to read a position signal of the servo region 26 of the magnetic disk 102, and the DSP 42 controls the VCM 106 to move the head 120 to a predetermined track position, thereby performing seek control (S10).

The MPU 44 checks the position of the read element 120-1 on the basis of the position signal of the servo region 26 read by the read element 120-1 (S12). In this way, as illustrated in FIG. 9, the read element 120-1 is positioned above the same track as the recording bit pattern of the data region 28.

Figure 10:
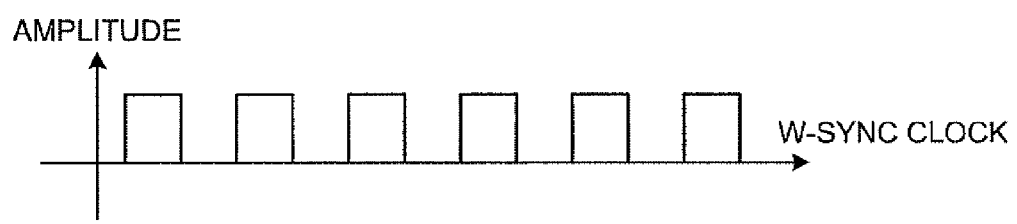
FIG. 10 is an exemplary diagram of a write synchronization signal of FIG. 9 in the one embodiment.

In this case, a reproduction signal read from the magnetic pattern 24 by the read element 120-1 is a write synchronization signal (write clock) having the sync mark 24-1 as a base point. In addition, as illustrated in FIG. 10, the reproduction signal is compared with a general bipolar magnetization signal for unipolar magnetization, and has an amplitude that is half of that of the bipolar magnetization signal. The timing recovery circuit 310 illustrated in FIG. 6 generates a clock synchronized with the reproduction signal read from the magnetic pattern 24, and supplies the clock as the write clock (S14). In this way, it is possible to perform subsequent writing at an exact timing.

That is, the period interval of the magnetic pattern 24 and the angle thereof in the radius direction are adjusted such that the same period signal as the bit pattern 28 is obtained by reproducing the magnetic pattern 24. In the embodiment, the angle of the magnetic pattern 24 in the radius direction is 45 degrees. However, the embodiment is not limited thereto, and the angle of the magnetic pattern 24 with respect to the medium radius direction and the pattern width thereof may be adjusted such that they are the integer multiple of the period between recording bits.

When a set (zone) of tracks having the same recording frequency is formed according to the position of the magnetic disk 102 in the radius position, the gap and angle of the magnetic pattern are selected so as to correspond to each zone.

Figure 11:
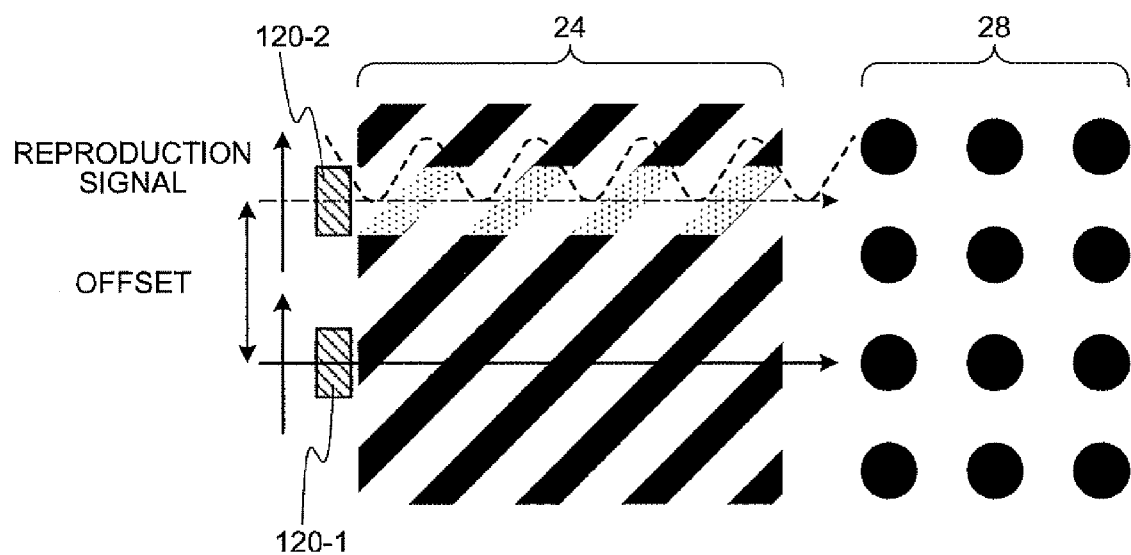
FIG. 11 is an exemplary diagram of measuring offset between the heads in a radius direction of FIG. 7 in the one embodiment.

After the position of the read element 120-1 and a basic write synchronization signal (clock) are acquired, the MPU 44 controls a write element 120-2 to perform writing such that the magnetic pattern 24 has a polarity opposite to the initial magnetization of the medium while maintaining the position of the head 120 (S16). As illustrated in FIG. 11, writing corresponding to general DC erase is performed to reverse the magnetization of the magnetic pattern 24 only at a position where the write element 120-2 passes through.

The MPU 44 moves the read element 120-1 in the radius direction to scan the magnetic pattern 24, thereby reading data (S18). The MPU 44 moves the read element 120-1 in the radius direction while monitoring the magnitude and polarity of a read output signal from the magnetic pattern 24 by the read element 120-1. Then, the MPU 44 detects the position of the read element 120-1 where the polarity of the read output signal is equal to a polarity opposite to that of the write element 120-2 and a maximum amplitude is obtained (that is, a signal indicating the locus of the write element 120-2 becomes the maximum). Then, the difference between the position of the read element 120-1 obtained in S12 and the position of the read element 120-1 obtained in S18 (that is, the position of the write element 120-2 in S16) is calculated, and the positional deviation (offset) between the write element 120-2 and the read element 120-1 in the radius direction is obtained.

The MPU 44 stores the calculated offset between the heads in the radius direction in the memory 46 (S20).

Figure 12:
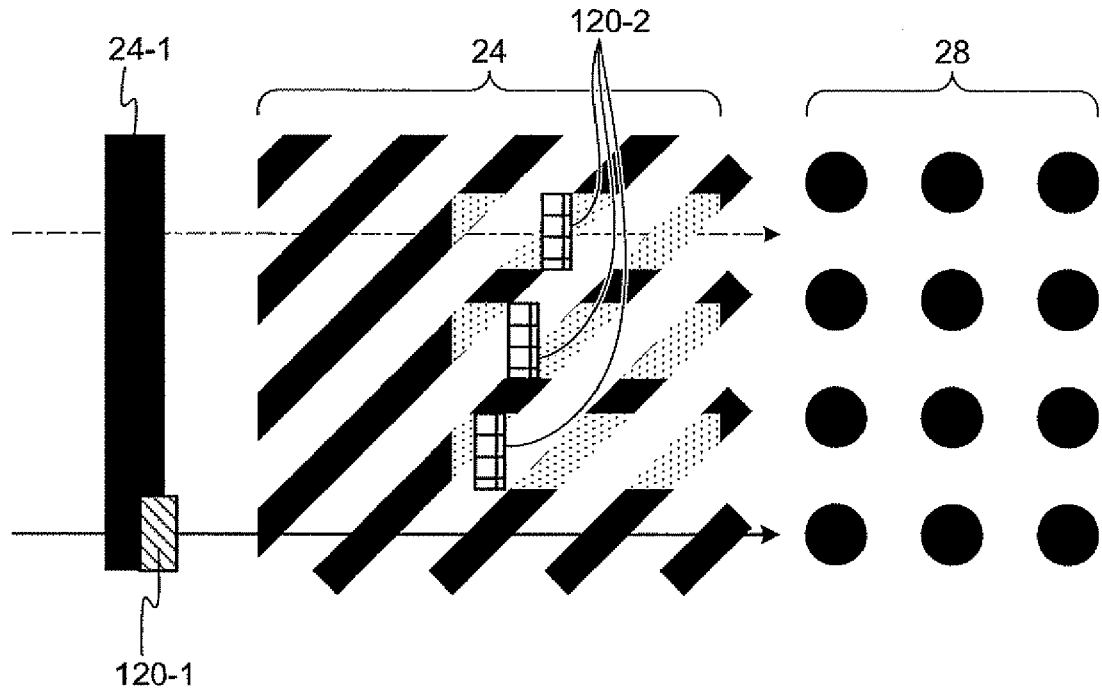
FIG. 12 is an exemplary diagram of measuring offset between the heads in a circumferential direction of FIG. 8 in the one embodiment.

Then, the write element 120-2 performs writing on the magnetic pattern 24 on the basis of the write synchronization signal (S22). The approximate position of the write element 120-2 relative to the read element 120-1 in the head 120 is calculated from the structure of the head. As illustrated in FIG. 12, DC erasing is performed such that the write element 120-2 scans a target track several times, and the locus of the write element 120-2 remains as a signal. That is, the MPU 44 determines the position of the read element 120-1 such that the write element 120-2 is disposed at the center of a target track, on the basis of the offset between the write element 120-2 and the read element in the radius direction. When the read element 120-1 detects the sync mark, the MPU 44 controls the write element 120-2 to perform the DC erasing. Then, the MPU moves the read element 120-1 in the radius direction and controls the write element 120-2 to perform the DC erasing.

Figure 13:
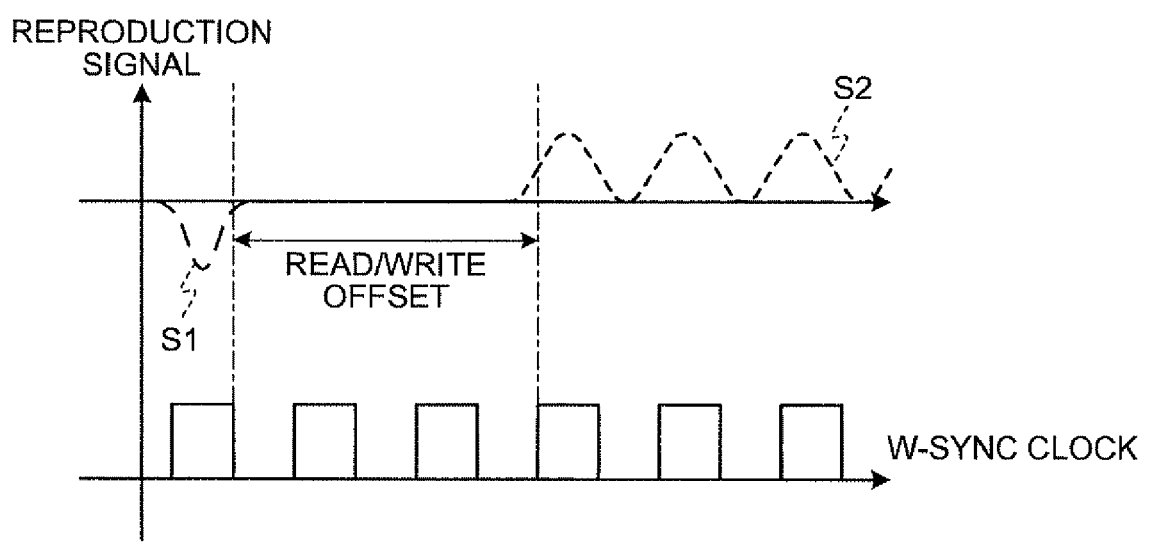
FIG. 13 is an exemplary diagram of the measuring of FIG. 12 in the one embodiment.

In S24, the MPU 44 aligns the position of the read element 120-1 with the position of the write element 120-2 performing the DC erasing to read the sync mark 24-1 and the magnetic pattern 24. Then, as illustrated in FIG. 13, the MPU 44 counts the write clock to obtain a signal period from a sync mark detection signal S1 to a reproduction signal S2 written by the write element 120-2. In a place where the write start position of the write element 120-2 is aligned with the central position of the track, the peak of the basic write synchronization (clock) signal is aligned with the peak of the obtained reproduction signal S2. When the write element 120-2 writes data at a position that deviates from the center of the track, the reproduction signal S2 having a phase difference from the basic synchronization signal is detected. The MPU 44 detects the number of basic clocks and the phase difference and calculates the time interval between the read element 120-1 and the write element 120-2.

The MPU 44 multiplies the time interval by the circumferential velocity of the magnetic disk to calculate the positional deviation (offset) between the read element and the write element in the circumferential direction of the medium (S26).

The MPU 44 stores the calculated offset between the heads in the circumferential direction in the memory 46 (S28).

Figure 14:
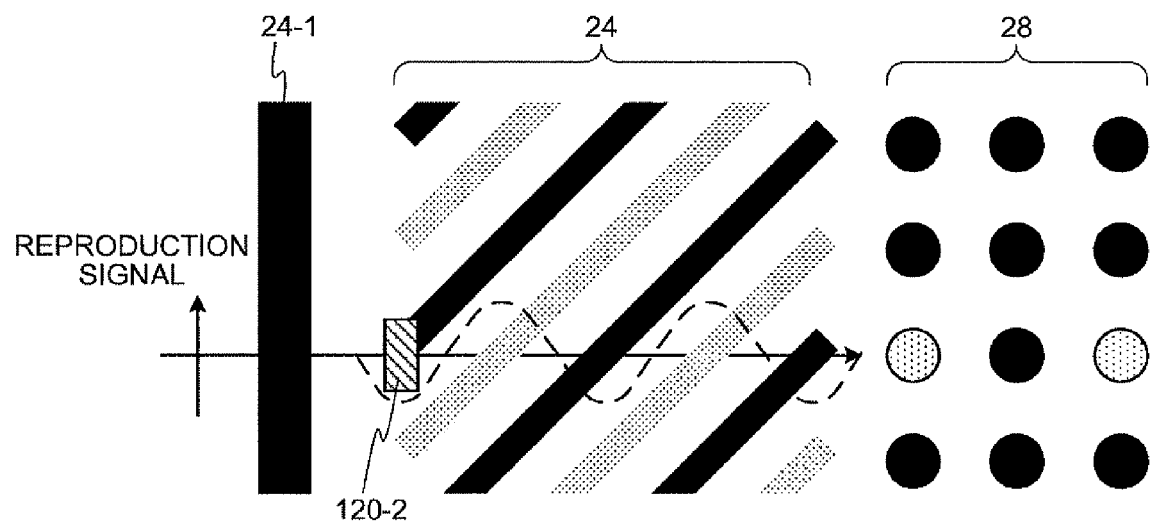
FIG. 14 is an exemplary diagram of writing of FIG. 8 in the one embodiment.

Finally, in S30, the magnetic pattern 24 serves as a preamble of a data signal. Therefore, the MPU 44 moves the write element 120-2 to a target track, as illustrated in FIG. 14, such that the magnetic pattern is detected as a bipolar signal during reading, and changes the magnetization direction with a period that is two times that of the basic clock (bit pattern). Then, the MPU 44 controls the write element to perform writing. In this way, as illustrated in FIG. 2, the magnetic pattern 24 is magnetically recorded on a hatched magnetic region such that the density of the hatched portion is changed in the magnetization direction, and a write clock having a period that is twice as long as that of the basic clock is obtained.

The detecting the offset between the heads is performed during an initial format, and information of the offset is stored in a ROM (not illustrated). In addition, when thermal expansion occurs due to a temperature variation or the position of the magnetic pattern deviates from the rotation center of the medium due to collision, the above-mentioned operation can be used to acquire position correction information of the heads.

When the periodicity of the arrangement of bits in the direction of each zone is maintained, the offset between the read and write heads in a representative zone may be measured, and the offset of other zones and tracks maybe calculated by interpolation.

Figure 15:
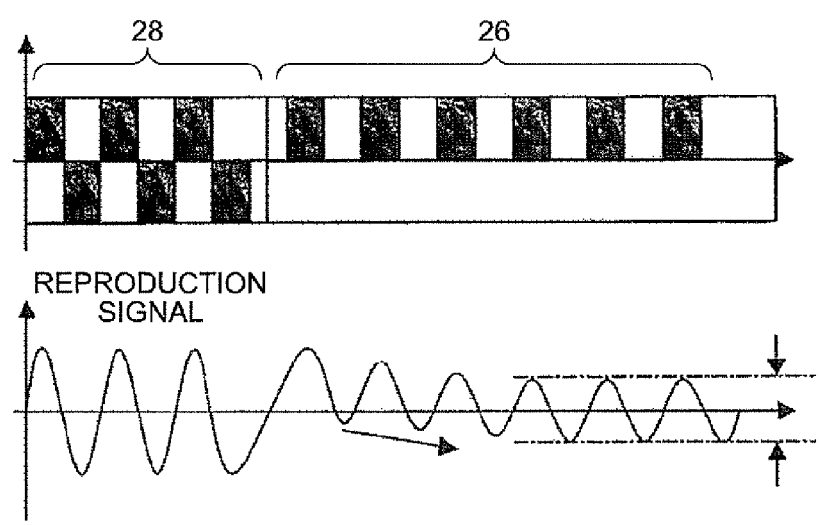
FIG. 15 is an exemplary diagram of the polarity of the writing of FIG. 14 in the one embodiment.

Next, usability of when the magnetic pattern 24 is used as a bipolar signal in S30 will be described with reference to FIGS. 15 and 16. In order to obtain a magnetic recording medium with high recording density, the servo region is formed by patterning a magnetic body. In this case, as illustrated in FIG. 15, in a vertical magnetic recording medium, the signal of the servo region 26 is a unipolar signal and is different from the signal (bipolar signal) of a general data region 28. The amplitude of the signal of the servo region 26 is about half of that of the signal of the general data region 28.

According to a general input circuit structure, in order to detect a reproduction signal, in the pre-amplifier module, a DC component is removed by a high pass filter. Therefore, when the head is moved from the data region 28 to the servo region 26 and from the servo region 26 to the data region 28, a transient response (Sag) occurs in the reproduction signal, as represented by an arrow in FIG. 15. In addition, since there is a difference in amplitude, it is necessary to adjust the gain.

Figure 16:
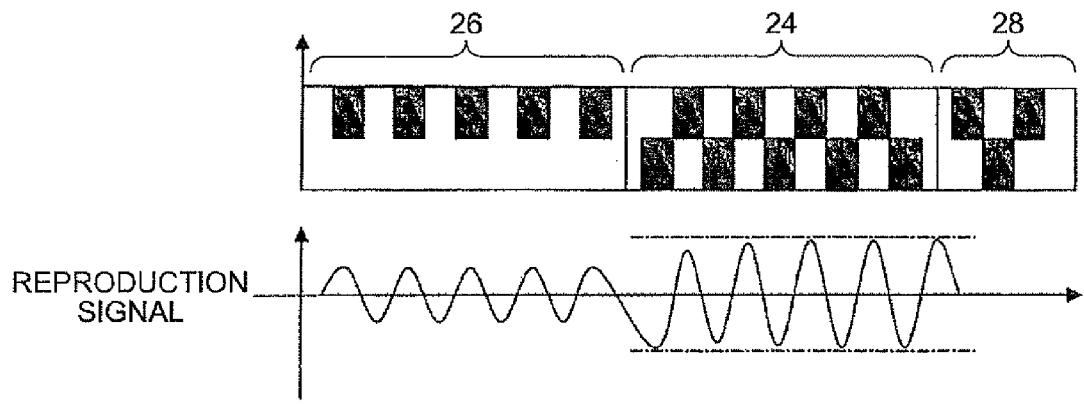
FIG. 16 is an exemplary diagram of recording the magnetic pattern of FIG. 14 in the one embodiment.

In the embodiment, as illustrated in FIG. 16, the magnetic pattern 24 is provided between the servo region 26 and the data region 28, and a bipolar signal is recorded thereon. Therefore, when the head is moved from the data region 28 to the servo region 26 and from the servo region 26 to the data region 28, the transient response of the amplitude is converged, and the synchronization of the reproduction signal and gain adjustment are performed before the data region 28.

In addition, the length of the magnetic pattern 24 is set to correspond to a time interval where the synchronization of the reproduction signal and gain adjustment can be performed. In this way, it is possible to stably reproduce signals even though the reproduction signal varies. That is, after measurement, the magnetic pattern 24 may serve as the preamble of data.

Figure 17:
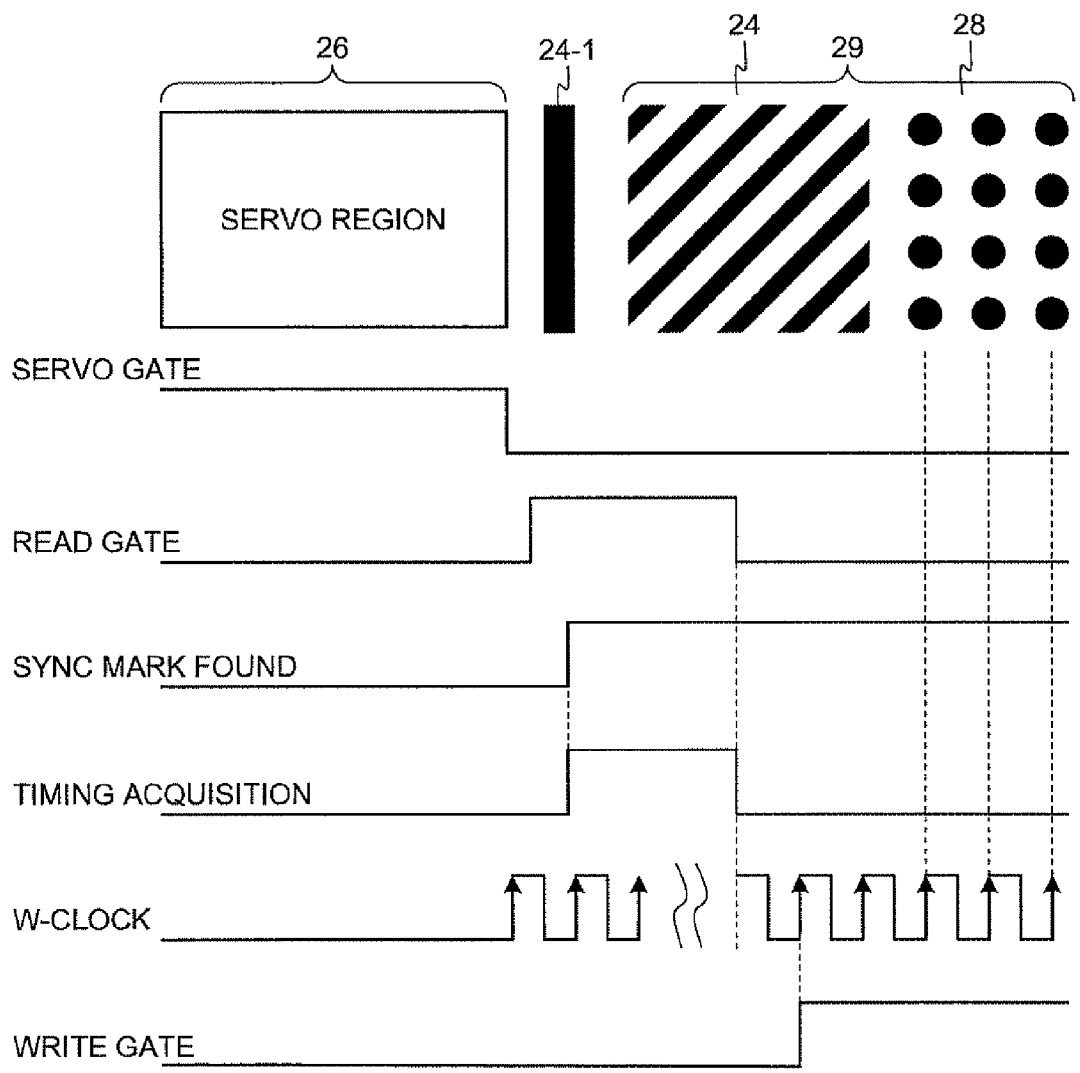
FIG. 17 is an exemplary diagram of the writing using the magnetic pattern in the one embodiment.

Next, writing/reading performed on the data region using the magnetic pattern 24 will be described. FIG. 17 is a diagram illustrating the writing. As illustrated in FIG. 17, the servo region 26, the sync mark 24-1, the magnetic pattern 24, and the data region 28 are provided in the magnetic recording medium in the circumferential direction thereof. The magnetic pattern 24 is treated as a portion of a data region 29.

First, when the read element 120-1 reads the servo region 26 and a servo gate signal for checking the position is turned off, a read gate signal is turned on and the read element 120-1 reads the sync mark 24-1 and the magnetic pattern 24. When a sync mark is detected from the read signal, the mark detection circuit 308 illustrated in FIG. 6 asserts a sync mark found signal.

In this way, the timing recovery circuit 310 acquires timing. That is, the timing recovery circuit 310 is PLL-synchronized with the reproduction signal of the magnetic pattern 24. As a result, the phase of the write clock is adjusted. The read gate signal is turned off for the writing. Then, a write gate signal is asserted in synchronization with the write clock, and the writing is performed on the data region 28 in synchronization with the write clock.

When the write clock is drawn in this way, the writing can be performed in synchronization with the write clock.

Figure 18:
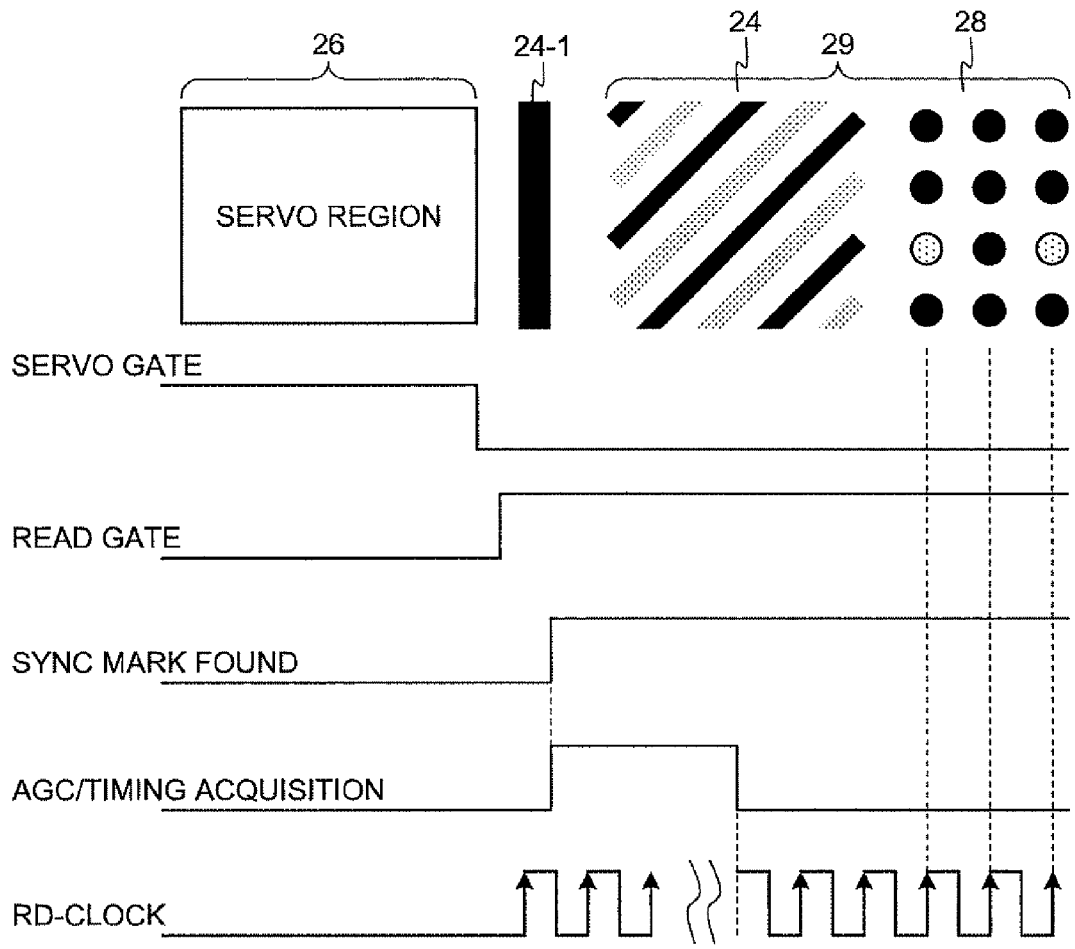
FIG. 18 is an exemplary diagram of reading using the magnetic pattern in the one embodiment.

FIG. 18 is a diagram illustrating reading. First, when the read element 120-1 reads the servo region 26 and the servo gate signal for checking the position is turned off, the read gate signal is asserted. The read element 120-1 reads the sync mark 24-1 and the magnetic pattern 24. When the sync mark is detected from the read signal, the mark detection circuit 308 illustrated in FIG. 6 asserts the sync mark found signal.

In this way, the timing recovery circuit 310 acquires timing. That is, the timing recovery circuit 310 is PLL-synchronized with the reproduction signal of the magnetic pattern 24. As a result, the phase of the read clock is adjusted. Then, the reading is performed on the data region 28 in synchronization with the read clock.

When the read clock is drawn in this way, the reading can be performed in synchronization with the read clock.

Figure 19:
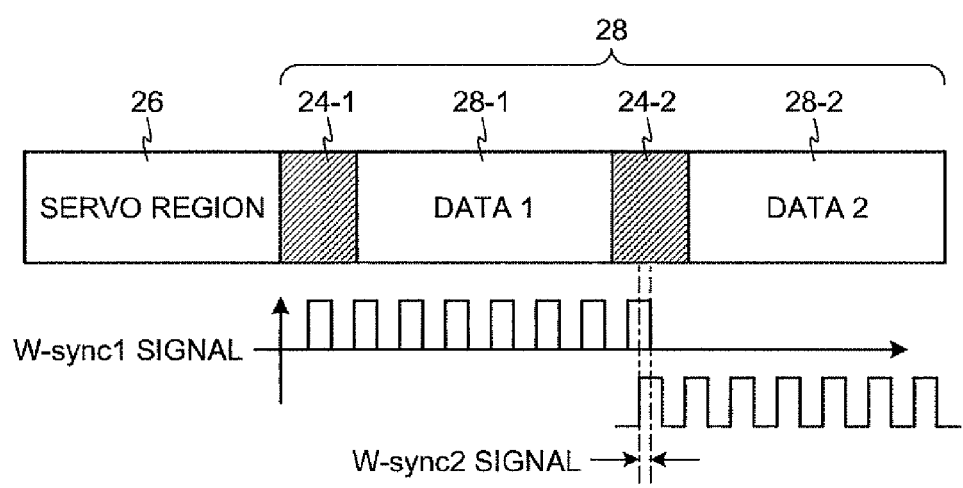
FIG. 19 is an exemplary diagram of a format of a magnetic recording medium according to another embodiment of the invention.
Figure 20:
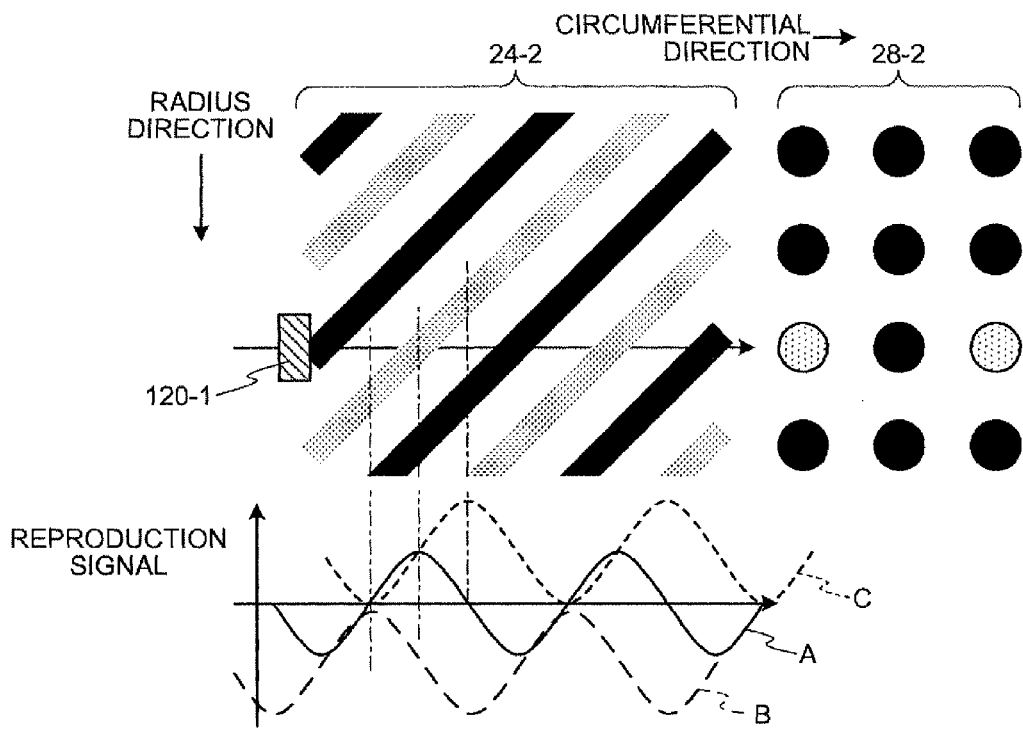
FIG. 20 is an exemplary diagram of phase adjusting of FIG. 19 in the another embodiment.

FIG. 19 is a diagram illustrating the format of a magnetic recording medium according to another embodiment of the invention, and FIG. 20 is a diagram illustrating correcting the phase thereof. FIG. 19 illustrates an example in which a data region 24 comprises magnetic patterns 24-1 and 24-2. In FIG. 20, a data region 28 is divided into data regions 28-1 and 28-2. The magnetic pattern 24-1 is arranged immediately after a servo region 26, and the magnetic pattern 24-2 is arranged between the data regions 28-1 and 28-2.

This arrangement is effective when the periodicity of the arrangement of recording bits in the data region 24 deteriorates or when a circumferential velocity is changed due to the positional deviation between a bit pattern position and the rotation center of the medium caused by the eccentricity of the medium.

That is, as illustrated in FIG. 19, the read element 120-1 reads a write synchronization signal from the magnetic pattern module 24-1 and a write operation is performed on a data region 28-1 in synchronization with the period of the write synchronization signal. Then, a basic write synchronization signal is acquired from the signal reproduced from the magnetic pattern module 24-2. When there is a phase difference between the write synchronization signal and the basic write synchronization signal, the phase difference is corrected and synchronous recording is performed on a data region 28-2.

That is, as illustrated in FIG. 20, when a normal reproduction signal is A, a reproduction signal having a phase delayed from that of the normal reproduction signal is represented by C, and a reproduction signal having a phase leading from that of the normal reproduction signal is represented by B. Therefore, for example, the reproduction signal A is obtained from the magnetic pattern 24-1. As illustrated in FIG. 19, when the write synchronization signal is generated from the reproduction signal and the phase of the reproduction signal C is changed in the next magnetic pattern 24-2, the phase difference between the write synchronization signal and the basic synchronization signal is corrected by the change in the phase of the reproduction signal C.

When the position of the track through which the read head passes is changed in the radius direction due to a position error in servo position control, there may be a phase difference in the reproduction signal of the magnetic pattern. Therefore, the permissible limit of the phase difference may be calculated on the basis of the off-track slice value of position control, and the permissible limit may be used as a criterion for the correction of the phase difference.

Figure 21:
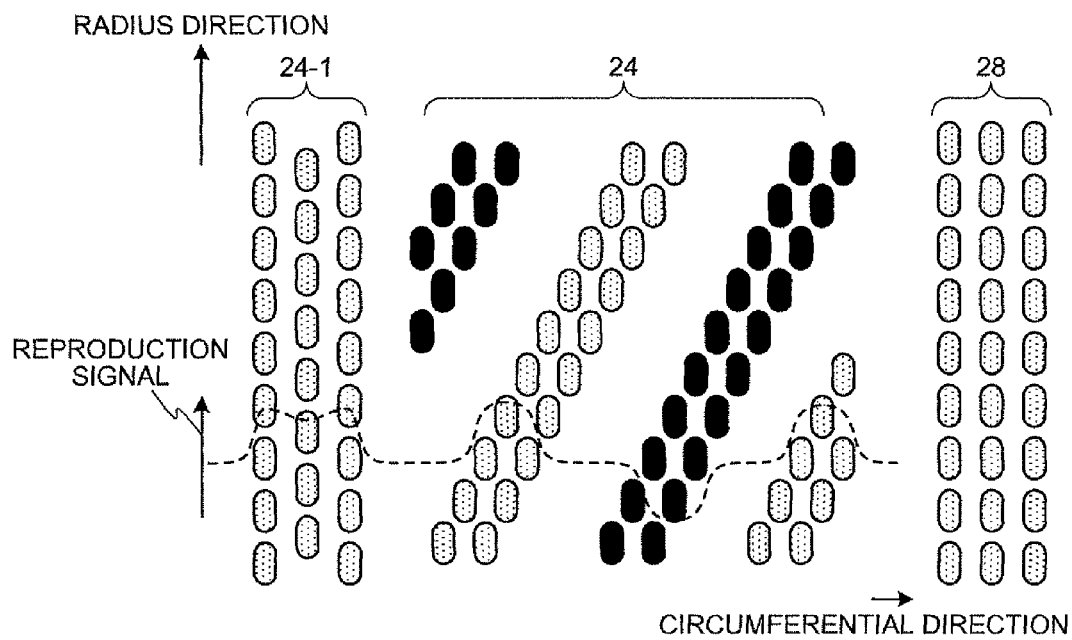
FIG. 21 is an exemplary diagram of a structure of a magnetic recording medium according to still another embodiment of the invention.
Figure 22:
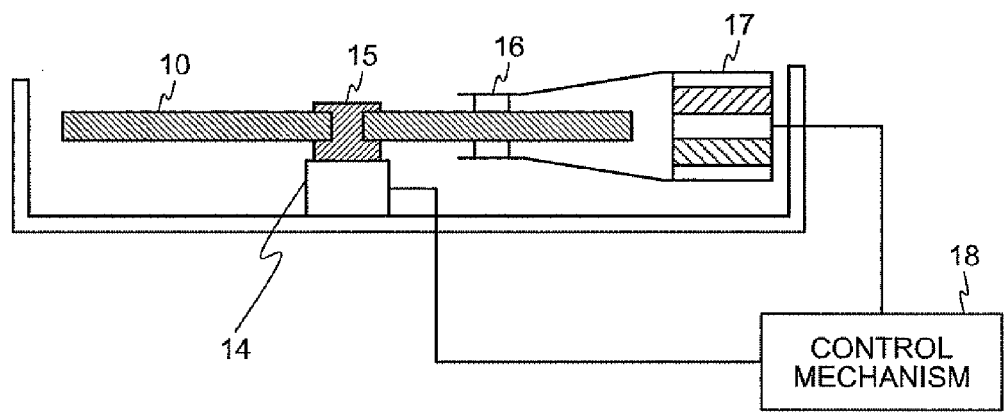
FIG. 22 is an exemplary diagram of a structure of a conventional magnetic recording apparatus.
Figure 23:
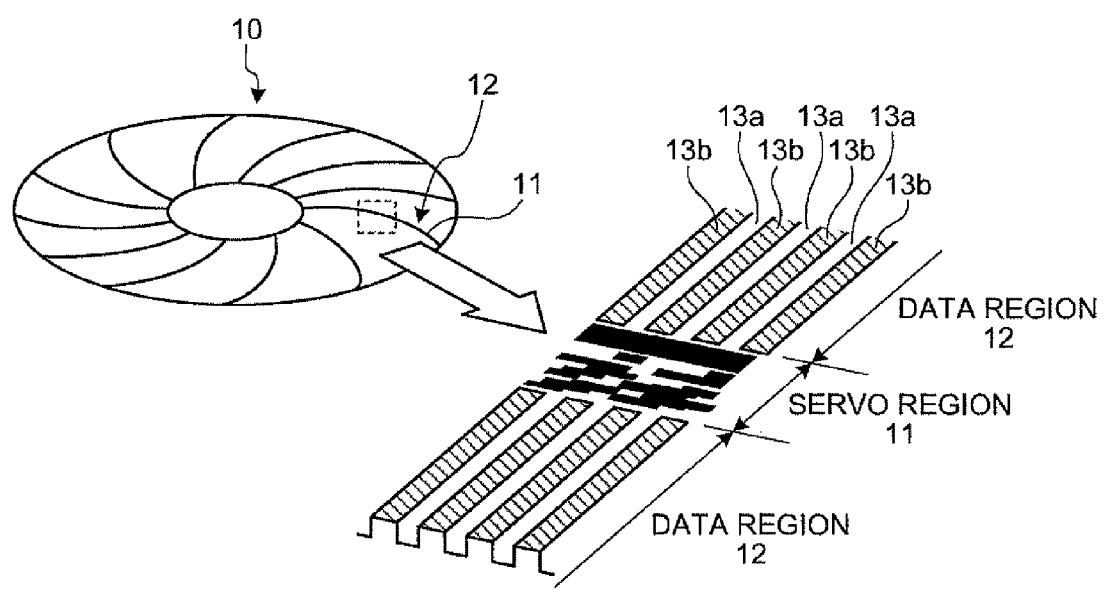
FIG. 23 is an exemplary diagram of a conventional discrete track medium.

FIG. 21 is a diagram illustrating the structure of a magnetic recording medium according to still another embodiment of the invention, in which the magnetic pattern 24 is formed as a magnetic bit pattern. Unlike the above-mentioned structure in which the magnetic film is patterned, when a magnetic bit pattern is formed, the resolution of the measurement of the offset between a write element and a read element is determined by the arrangement of the bit patterns.

In the structure illustrated in FIG. 21, individual magnetic bit patterns are arranged so as to overlap each other in the radius direction of the medium. Therefore, it is possible to maintain the linearity of the offset by detecting the center of the waveform of a signal.

In addition, the resolution of the measurement of the offset between the write element and the read element in the circumferential direction of the medium is determined by the arrangement of the magnetic bit patterns. In FIG. 21, since the inclined magnetic pattern 24 is composed of two dots, the resolution of the offset is the width of the magnetic pattern.

In the magnetic recording medium including the magnetic regions that are separated from each other between the tracks, the periodic magnetic pattern region is provided at the head portion of the data region following the servo region in the radius direction of the magnetic recording medium so as to be inclined at a predetermined angle. Therefore, it is possible to read the magnetic pattern to acquire a basic clock signal and detect the offset between the write element and the read element in the radius direction and the circumferential direction. As a result, it is possible to reduce the time required to synchronize the recording timing of a high-density recording medium in which the magnetic regions are separated between the tracks and improve the performance of a magnetic recording apparatus.

The periodic inclined magnetic pattern structure has a pattern shape in which an obtained reproduction signal has constant periodicity and the period of the reproduction signal is the integer multiple of the period of a signal with the shortest period in the recording signals. Therefore, it is possible to further reduce the time required to synchronize the recording timing.

The length of the periodic inclined magnetic pattern structure in the circumferential direction of the medium is set such that the width of the pattern is longer than a transient time (transient response time) when recording and reproducing are switched. Therefore, it is possible to reliably synchronize a changed signal to detect a clock signal.

In addition, a single or a plurality of periodic inclined magnetic pattern structures is provided in the data region interposed between the servo regions. Therefore, when the periodicity of the arrangement of the recording bits of the medium deteriorates or when there is a temporal variation between the period of the recording bit pattern and the circumferential velocity due to the eccentricity of the pattern, it is possible to adjust the phase difference of the recording clock signal by reading the inclined magnetic pattern from the data region. Therefore, it is possible to provide a magnetic recording apparatus that has a high performance and is capable of obtaining good recording and reproduction signals from a medium with high recording density.

Although the above-described embodiments are explained using the patterned medium comprising the data region composed of the magnetic bit patterns, the discrete track media may also be used. Further, although the vertical recording method is described, a horizontal recording method may also be used.

The technique for detecting the offset between the write element and the read element and the technique for correcting a variation in the frequency of the recording clock signal may also be applied to a conventional discrete track recording method and a conventional continuous medium recording method, in addition to the patterned media recording method.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic recording medium to which a signal is recorded by reversing magnetization of a magnetic body, the magnetic recording medium comprising:
    a servo region to which a servo signal is written;
    a data region comprising a first magnetic region of a first track configured to store data, and a second magnetic region of a second track separate from the first magnetic region;
    a periodic magnetic pattern region at a head portion of the data region following the servo region, the periodic magnetic pattern region oblique at a predetermined angle with respect to a radius direction and a circumferential direction of the magnetic recording medium over a predetermined length in the radius direction of the magnetic recording medium, the radius direction parallel to a magnetic head.

2. The magnetic recording medium of claim 1, wherein the periodic magnetic pattern region comprises a plurality of periods and a plurality of angles with respect to the circumferential direction of the magnetic recording medium between a plurality of zones in the radius direction of the magnetic recording medium.

3. The magnetic recording medium of claim 1, wherein the periodic magnetic pattern region comprises a pattern shape in such a manner that a reproduction signal read from the magnetic pattern region by a read element comprises a predetermined period, and the period is an integer multiple of a substantially shortest period of a signal among recorded signals of the data region.

4. The magnetic recording medium of claim 1, wherein a length of the periodic magnetic pattern region in the circumferential direction of the magnetic recording medium is substantially equal to a pattern width corresponding to a time that is longer than a transient time for switching between recording and reproducing.

5. The magnetic recording medium of claim 1, wherein the data region comprises a plurality of periodic magnetic pattern regions.

6. The magnetic recording medium of claim 1, wherein a sync mark is recorded between the servo region and the periodic magnetic pattern region.

7. The magnetic recording medium of claim 1, wherein the data region comprises a perpendicular magnetic recording material.

8. The magnetic recording medium of claim 1, wherein at least the data region comprises a magnetic dot pattern.

9. A magnetic recording apparatus comprising:
    a magnetic recording medium comprising: a servo region to which a servo signal is written; a data region comprising a first magnetic region of a first track configured to store data, and a second magnetic region of a second track separate from the first magnetic region of the first track; and a periodic magnetic pattern region at a head portion of the data region following the servo region, the periodic magnetic pattern region oblique at a predetermined angle with respect to a radius direction and a circumferential direction of the magnetic recording medium over a predetermined length in the radius direction of the magnetic recording medium;
    a head comprising a read element and a write element, and configured to read and write with respect to the magnetic recording medium, the head parallel to the radius direction; and
    a controller configured to control the read element and the write element, and to generate a signal synchronized with a write clock signal from a reproduction signal read from the periodic magnetic pattern region by the read element.

10. The magnetic recording apparatus of claim 9, wherein the controller is configured to measure a positional deviation between the write element and the read element of the head in the radius direction of the magnetic recording medium from a reproduction signal read from the periodic magnetic pattern region by the read element of the head.

11. The magnetic recording apparatus of claim 10, wherein the controller is configured to move the read element of the head to a desired track position, to control the write element to record a signal on the periodic magnetic pattern region, to move the read element in the radius direction of the magnetic recording medium, to detect the signal recorded by the write element from the reproduction signal from the read element, and to measure a positional deviation of the magnetic recording medium in the radius direction on the basis of the position of the read element in the radius direction.

12. The magnetic recording apparatus of claim 10, wherein the controller is configured to move the read element of the head to a desired track position, to control the write element to record a signal on the periodic magnetic pattern region using a sync mark between the servo region and the periodic magnetic pattern region as a reference point, to move the read element in the radius direction of the magnetic recording medium, to detect the signal recorded by the write element from the reproduction signal read from the read element, and to measure a positional deviation of the magnetic recording medium in the circumferential direction based on a time interval from detection of the sync mark to the detection of the reproduction signal by the read element.

13. The magnetic recording apparatus of claim 9, wherein the controller is configured to measure a positional deviation between the write element and the read element of the head in the circumferential direction of the magnetic recording medium from the reproduction signal read from the periodic magnetic pattern region read by the read element of the head.

14. The magnetic recording apparatus of claim 9, wherein the periodic magnetic pattern region comprises a plurality of periods and a plurality of angles with respect to the circumferential direction of the magnetic recording medium between a plurality of zones in the radius direction of the magnetic recording medium.

15. The magnetic recording apparatus of claim 9, wherein the periodic magnetic pattern region comprises a pattern shape in such a manner that the reproduction signal read from the magnetic pattern region by the read element comprises a predetermined period and the period is the integer multiple of a substantially shortest period of a signal among recorded signals of the data region.

16. The magnetic recording apparatus of claim 9, wherein the length of the periodic magnetic pattern region in the circumferential direction of the magnetic recording medium is substantially equal to a pattern width corresponding to a time that is longer than a transient time for switching between recording and reproducing, and the controller is configured to adjust a signal gain on the basis of the reproduction signal read from the periodic magnetic pattern region by the read element.

17. The magnetic recording apparatus of claim 9, wherein the data region comprises a plurality of periodic magnetic pattern regions.

18. The magnetic recording apparatus of claim 9,
wherein the magnetic recording medium comprises a sync mark recorded between the servo region and the periodic magnetic pattern region, and the controller is configured to detect the sync mark and to generate a signal synchronized with the write clock signal from the reproduction signal.

19. The magnetic recording apparatus of claim 9,
wherein the magnetic recording medium is a perpendicular magnetic recording medium, the servo region is unipolarly magnetized, and the periodic magnetic pattern region is bipolarly magnetized.

20. The magnetic recording apparatus of claim 9, wherein the controller is configured to adjust a phase difference between the reproduction signal read from the periodic magnetic pattern region and a recording clock signal from the reproduction signal of the servo region, and performs recording and reproducing operations.

* * * * *